Patented Aug. 25, 1931

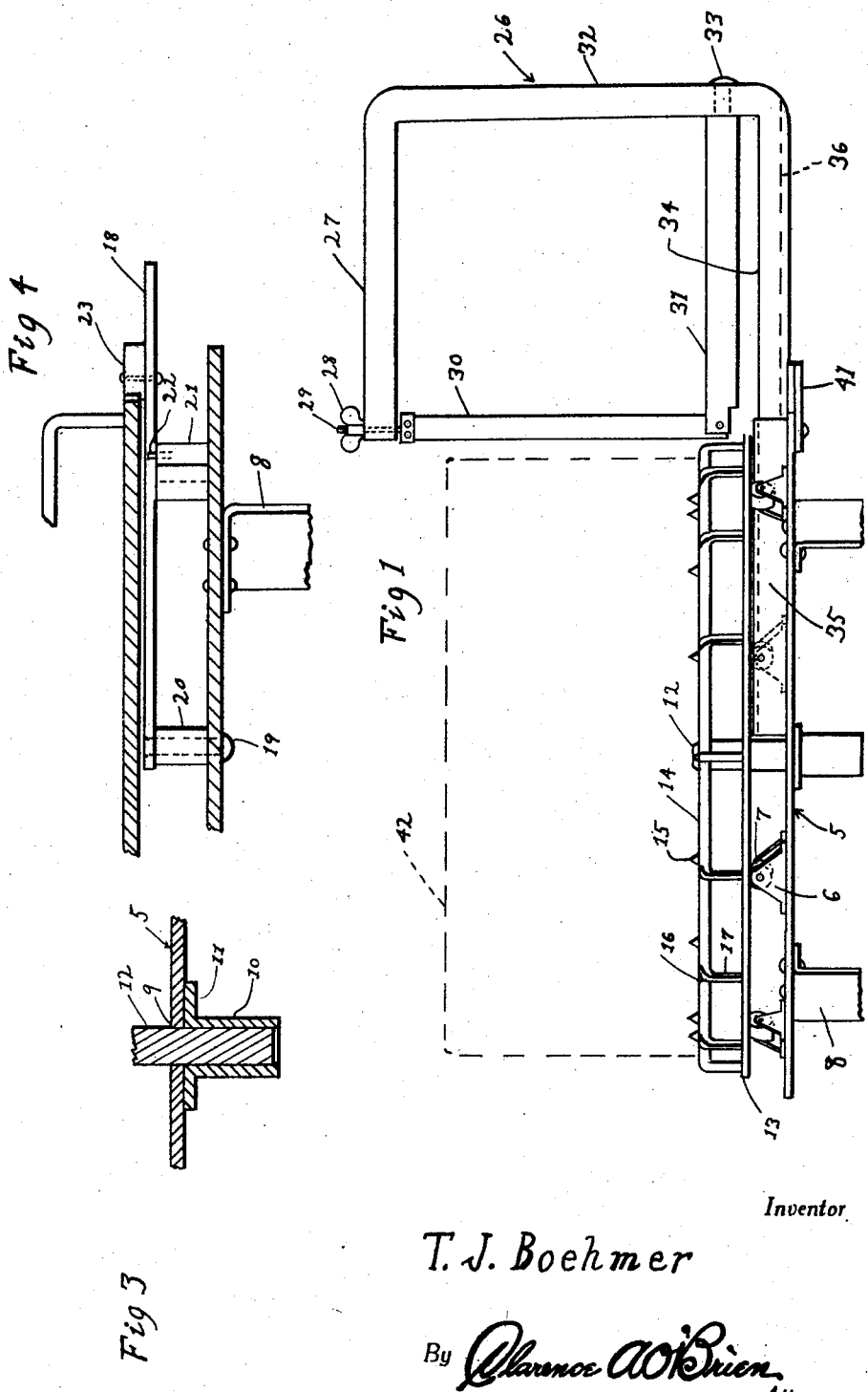

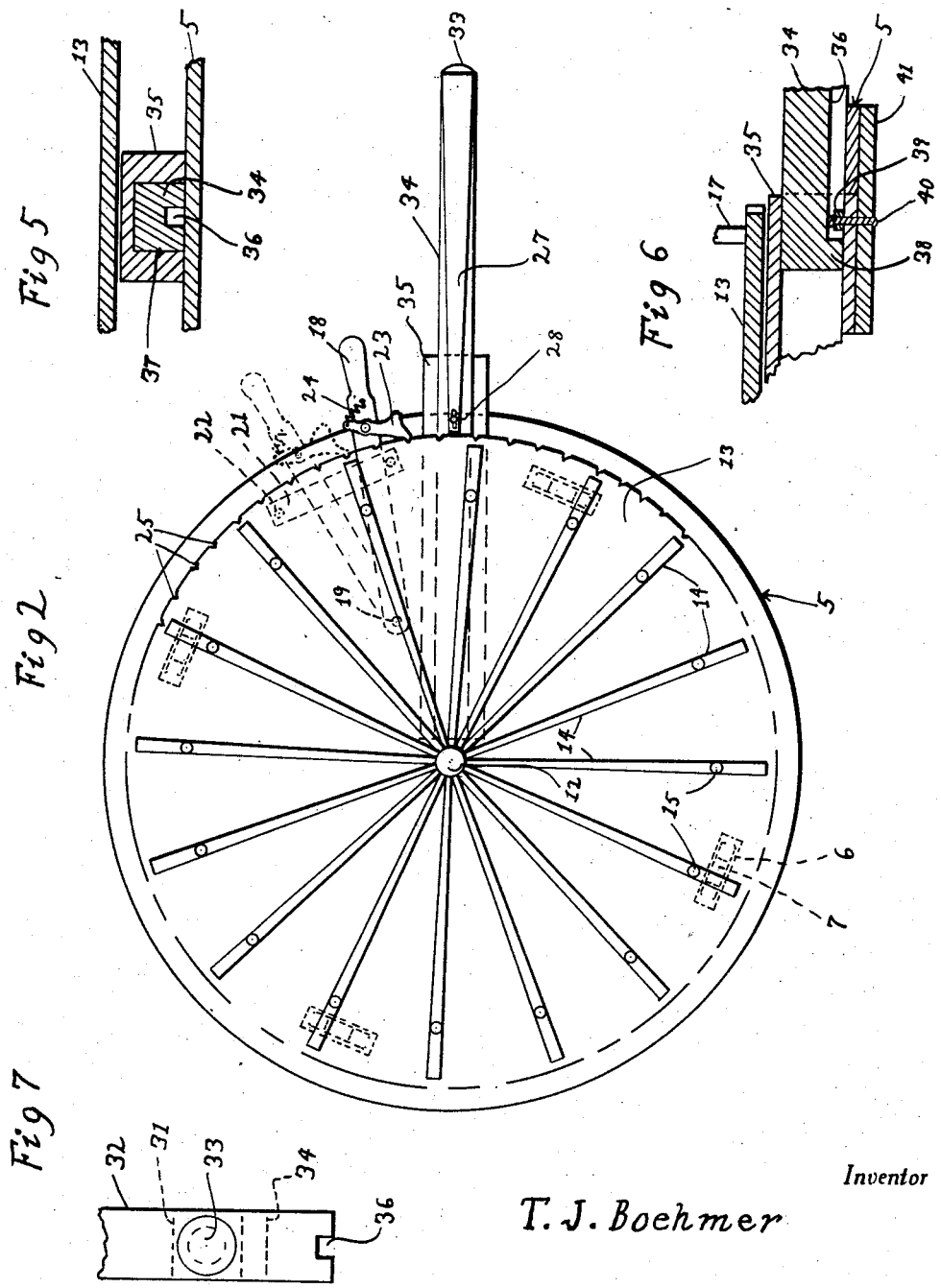

1,820,342

UNITED STATES PATENT OFFICE

THEODORE J. BOEHMER, OF COLUMBUS, OHIO

CHEESE CUTTER

Application filed October 11, 1930. Serial No. 488,111.

This invention relates generally to cheese cutters, and particularly to a cheese cutter especially adapted for counter use, or for use in refrigerators, eliminating the necessity of handling the cheese, and specifically to a cheese cutter of this latter kind which is adapted to cut the cheese in predetermined sizes.

It is an object of this invention to provide a cheese cutter of the type described which is very little larger than the cheese itself, the type of cheese which it is adapted to be used with being called in the trade Daisy or a flat or a Cheddar cheese, which comes formed in cylindrical or frusto-conical shapes.

It is also an object of this invention to provide a cheese cutter of the type described which on account of its small bulk may be used for cutting cheese in refrigerators and other places without removing the cheese therefrom, thus lessening the inconvenience and disadvantage of unnecessarily handling the refrigerated cheeses.

These and other objects, the nature of the invention, its composition and arrangement and combination of parts will be readily understood by any one acquainted with the art to which the invention relates upon consulting the following descriptions of the drawings, from which will be seen that the invention possesses numerous features of novelty and convenience, together with advantages not heretofore known in a device of this type.

In the drawings:—

Figure 1 is a general side elevational view of my improved cheese cutter.

Figure 2 is a top view thereof.

Figure 3 is a detail transverse vertical cross section disclosing the arrangement of the pivotal support for the rotatable cheese support.

Figure 4 is a transverse vertical cross sectional view disclosing the mounting of the lever mechanism for turning the cheese support.

Figure 5 is a transverse vertical cross sectional view through the lower part of the cutter structure.

Figure 6 is a further view thereof taken in longitudinal vertical cross sectional view.

Figure 7 is a detailed enlarged view of the lower portion of the cutter structure taken from the right of Figure 1.

Referring in detail to the drawings, in which like numerals designate like parts throughout, the numeral 5 designates generally a flat plate, preferably circular, and from which rises at intervals a plurality of pairs of triangularly formed brackets 6 in which are rotatably mounted rollers 7. The plate 5 is supported on a plurality of legs 8 suitably secured by rivets or the like at intervals near the periphery thereof. Centrally of the plate 5 there is provided an aperture 9. Surrounding this aperture on the underside of the plate is a tubular socket like member 10 having a laterally directed flange 11 abutting the underside of the plate 5. A shaft 12 is journaled in the aperture 9 and in the socket 10 and it rises and has fastened to its upper portion a rotatable plate 13 which carries a plurality of bars 14 which have near their outer ends sharp projections 15. The bars 14 are arranged parallel and vertically spaced from the plate 13 and their outer ends are bent as at 16 downwardly directed to form columns 17 which are secured to the upper surface of the plate 13. The bars 14 are arranged so that their inner ends converge and are attached to the shaft 12, and their outer ends are equally spaced about the circumference of the plate 13, which is preferably formed in the shape of a circular disk. The cheese is placed upon the bars 14, and the plate 13 is adapted to be rotated by a structure to be immediately described below.

Means for controllably turning the plate 13 and hence the cheese thereon consists of a hand lever 18, supported and pivoted under the plate 13 on a pivot 19, the inner end of the lever being spaced from the plate and supported by a sleeve 20 surrounding the pivot pin 19. An intermediate portion of the lever 18 rests upon a block 21 which has on its upper surface a pair of stop pins 22 for limiting the movement of the lever 18. Beyond the point defined by the block 21 the lever 18 has mounted on its upper surface a pawl 23 which is retained normally in engagement with the outer edge of the plate 13 by a spring 24 suitably mounted. The outer edge or periphery of the disk 13 is provided with equally spaced notches 25. These notches divide the space between each pair of said bars 14 into quarter parts, and the stop pins 22 limit the stroke of the lever 18, so that in a movement thereof no more than the distance between two of said adjacent bars can be brought about in one actuation of the lever. It is obvious that the movement of the lever 18 may be stopped at any notch between said bars, and thus is provided for a predetermined movement of the lever 18 and hence a predetermined amount of turning of the disk 13, resulting in a positioning of a cutting mechanism to be described, for cutting a predetermined amount of cheese.

The cheese cutting structure comprises a blade holder generally designated 26 which comprises a U-shaped frame the top member of which 27 is inwardly tapered as indicated in Figure 2. At the inner end thereof it is provided with a wing nut riding on a screw threaded shank designated 28, 29, respectively, which constitutes the mechanism for keeping taut a cutting element 30 which may be a wire or a blade. The lower end of the blade 30 is passed through a slot in the inner end of a similarly tapered bar 31 which is secured to the back member 32 of the frame 26 by means of a bolt or rivet 33. The bar 31 is parallel and vertically spaced from the base member 34. The base member is provided to slide radially with respect to the center of the disk 13 in a block 35 cut out as at 37 to form a housing and guide for the same. This is more clearly seen in Figures 5 and 6. The base member 34 is provided with a central longitudinal slot 36 in the bottom face thereof which extends the full length of the base member 34 with the exception of a short distance 38, which is not cut away but which forms a stop to prevent the complete withdrawal of the frame 26 from the guide 35, through the agency of a stop lug 39 secured in position by a bolt 40 as shown in Figure 6. An extra plate 41 is secured to the portion of the plate 5 adjacent the frame guide structure for bracing the same.

It is thought to be obvious that the frame 26 is adapted to be pushed inwardly toward the center of the circular disk for cutting the cheese which is generally designated in dotted lines by the numeral 42. In this operation the bar 31 comes between the bar 14 and over the disk 13, whereas the bar 34 passes under the plate 13 and above the plate 5 in the guide housing 35. The space between any two adjacent bars 14 represents a pound of cheese, and each division thereof represented by the notches 25 constitutes a quarter of a pound, so that the lever 18 may be adjusted to bring the cheese into proper measured position for the blade to cut a predetermined amount of cheese upon the inward travel thereof. It should be stated that in the arrangement disclosed herein the disk 13 has a clockwise motion.

It is to be definitely understood that I do not desire to limit the application of this invention to the particular modification set forth herein to illustrate the principles thereof, and any change or changes may be made in material and structure and re-arrangement of parts consistent with the spirit and scope of the invention.

Having described the invention what is claimed as new is:—

A cheese cutter of the type described comprising a base, a platform rotatably supported in a vertically spaced manner on said base, a radially reciprocable blade structure slidably mounted on said base, and means to controllably rotate the platform for positioning the platform with respect to the blade structure, and means on the platform for preventing horizontal displacement of a cheese placed thereon.

In testimony whereof I affix my signature.

THEODORE J. BOEHMER.